(12) United States Patent
Maruoka

(10) Patent No.: US 8,807,183 B2
(45) Date of Patent: *Aug. 19, 2014

(54) HEAVY DUTY TIRE

(75) Inventor: Kiyoto Maruoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 1236 days.

This patent is subject to a terminal disclaimer.

(21) Appl. No.: 12/222,571

(22) Filed: Aug. 12, 2008

(65) Prior Publication Data

US 2009/0056851 A1  Mar. 5, 2009

(30) Foreign Application Priority Data

Sep. 4, 2007  (JP) .................................. 2007-229266

(51) Int. Cl.
*B60C 15/00* (2006.01)
*B60C 15/06* (2006.01)

(52) U.S. Cl.
USPC ............................ 152/539; 152/541; 152/546

(58) Field of Classification Search
None
See application file for complete search history.

(56) References Cited

U.S. PATENT DOCUMENTS 4,941,523 A * 7/1990 Galante et al. ................. 152/543
7,909,077 B2 * 3/2011 Maruoka ....................... 152/539

FOREIGN PATENT DOCUMENTS

| JP | 2-133208 | * | 5/1990 |
| JP | 7-101212 | * | 4/1995 |
| JP | 2002-052909 A | | 2/2002 |

OTHER PUBLICATIONS

Machine translation of JP 7-101212.*
Machine translation of JP 7-101212, 1995.*

* cited by examiner

*Primary Examiner* — Justin Fischer
(74) *Attorney, Agent, or Firm* — Birch, Stewart, Kolasch & Birch, LLP

(57) ABSTRACT

A heavy duty tire comprises: a bead filler disposed radially outside a bead core and axially outside a carcass main portion; a bead-reinforcing layer made of steel cords; and a chafer made of a rubber extending along the bead bottom surface. The chafer rubber has a complex elastic modulus in a range of 8 to 12 MPa and a 100% modulus in a range of 4.0 to 5.5 MPa. In the bead-reinforcing layer, the steel cord count is 25 to 40/5 cm, the steel cord diameter is 0.8 to 1.2 mm, and the cord angle is 30 to 60 degrees with respect to the tire radial direction. The bead filler comprises a main filler made of a low modulus rubber and a fastening filler made of a high modulus rubber. The fastening filler has an L-shaped cross sectional shape and comprises an axially-extending base portion and a radially-extending axially inner portion. The main filler has a part wedged between the base portion and axially inner portion of the fastening filler.

7 Claims, 5 Drawing Sheets

HEAVY DUTY TIRE

BACKGROUND OF THE INVENTION

The present invention relates to a pneumatic tire, more particularly to a bead structure suitable for heavy duty tires improved in the bead durability.

In recent years, reuse of heavy duty tires through retreading come to the front in view of resource saving and the reduction of carbon dioxide emissions. Thus, demand for heavy duty tires having a tire structure, especially a bead structure endurable over two life cycles have risen markedly.

In general, the heavy duty tires for trucks, busses and the like are, as shown in FIG. 5, provided with a bead portion (4) having an acute-angled bead toe (bt). Such acute-angled bead toe closely contacts with the bead seat (4Sa) of the wheel rim when the tire is mounted on a wheel rim, and provides a tight air sealing effect.

Conventionally, a hard rubber compound is used as the so called chafer rubber (23) extending from the axially outer surface of the bead portion to the bead toe through the bead bottom (bs). When the tire is mounted on the wheel rim or demounted from the wheel rim, for example as shown in FIG. 5 in dashed-dotted line, the bead toe (bt) is deformed largely in order to go over the rim flange (Rf). Thus, the bead toe (bt) is liable to be flawed and damaged by the rim flange.

In order to withstand such a large deformation, if the bead toe is formed from a relatively soft rubber compound in stead of the hard rubber compound, then the damage of the bead toe during mounting and demounting operations may be reduced. But, if such soft rubber is used beneath the bead core (5), the rubber is very liable to be crushed between the bead core (5) and the bead seat (4Sa) since a large compressive force is caused therebetween during use especially heavy duty use.

In either case, namely, if the flaws in the bead toe or crashing beneath the bead core is caused, the tire can not be reused.

A combination use of two compounds, namely, a soft rubber compound for the bead toe and a hard rubber compound for the bead bottom, is conceivable, but difficult because the bead toe and bead bottom are contiguous and, if the interface between such different compounds exists in the bead base portion, a separation failure more likely occurs.

Therefore, the present inventor studied and discovered that: in most cases where the relatively soft rubber chafer is crushed, the bead reinforcing layer (20) causes a cord angle variation, specifically, an increase in the cord angle with respect to the tire radial direction; and the smaller cord angle is more disadvantageous to the resistance to crushing; and that by increasing the cord angle up to a value between 30 to 60 degrees, a relatively low modulus range by which the flaws in the bead toe can be avoided, can encompass a modulus range within which the crushing can be also prevented.

SUMMARY OF THE INVENTION

It is therefore, an object of the present invention to provide a heavy duty tire in which, by specially defining the modulus of the clinch rubber and the cord angle of the bead reinforcing layer together with the structure of a bead filler, flaws in the bead toe and crashing beneath the bead core are effectively prevented and thereby the durability of the bead portion is improved so as to enable the reuse of the tire.

According to the present invention, a pneumatic tire for heavy duty use comprises:

a pair of bead portions each with a bead core therein;

a carcass ply extending between the bead portions and turned up around the bead core in each of the bead portions from the inside to the outside of the tire to form a pair of turned up portions and a main portion therebetween;

a bead-reinforcing cord layer disposed in each of the bead portions and composed of a ply of steel cords, which ply comprises a base part beneath the bead core, an axially inner part extending radially outwardly along the carcass ply main portion, and an axially outer part extending radially outwardly along the carcass ply turned up portion, wherein the ply has a steel cord count in a range of from 25 to 40/5 cm, the steel cords have a diameter in a range of from 0.8 to 1.2 mm, and the steel cords arranged at an angle in a range of from 30 to 60 degrees with respect to the tire radial direction;

a bead filler disposed axially outside the carcass ply main portion and radially outside the bead core in each of the bead portions, and composed of a main filler made of a low modulus rubber, and a fastening filler made of a high modulus rubber, wherein the fastening filler comprises a base portion extending along the radially inner surface of the bead filler, and an axially inner portion extending radially outwardly from the base portion along the axially inner surface of the bead filler, so as to have an L-shaped cross sectional shape, and the main filler has a part wedged between the base portion and axially inner portion of the fastening filler; and a chafer disposed in each of the bead portions, and comprising a base part extending between the bead toe and bead heel, defining the bottom surface of the bead portion, an axially outer part extending radially outwardly from the bead heel, and an axially inner part extending radially outwardly from the bead toe, wherein the chafer has a complex elastic modulus in a range of 8 to 12 MPa and a 100% modulus in a range of 4.0 to 5.5 MPa.

In this application, the sizes, dimensions, positions and the like of the tire are referred to as those under the standard state of the tire unless otherwise noted.

Here, the standard state is that the tire is mounted on a standard wheel rim and inflated to 50 kPa, but loaded with no tire load.

The standard wheel rim is a wheel rim officially approved for the tire by standard organization, i.e. JATMA (Japan and Asia), T&RA (North America), ETRTO (Europe), STRO (Scandinavia) and the like. For example, the standard wheel rim is the "standard rim" specified in JATMA, the "Measuring Rim" in ETRTO, and the "Design Rim" in TRA.

The height means a radial distance measured from the bead base line BL unless otherwise noted.

The bead base line BL is a straight line drawn in parallel with the tire rotational axis, passing through the bead heel points. More specifically, the bead base line passes through a radial position corresponding to the rim diameter of the standard wheel rim.

The complex elastic modulus E* is measured at a temperature of 70 degrees C., frequency of 10 Hz, initial strain of 10%, and amplitude of dynamic strain of +/−2%.

The 100% modulus is measured at a temperature of 23 degrees C. and strain of 100% according to Japanese Industrial Standard (JIS) K6251 "Tensile testing methods for vulcanized rubber".

DESCRIPTION OF THE PREFERRED EMBODIMENT(S)

Figure 1:
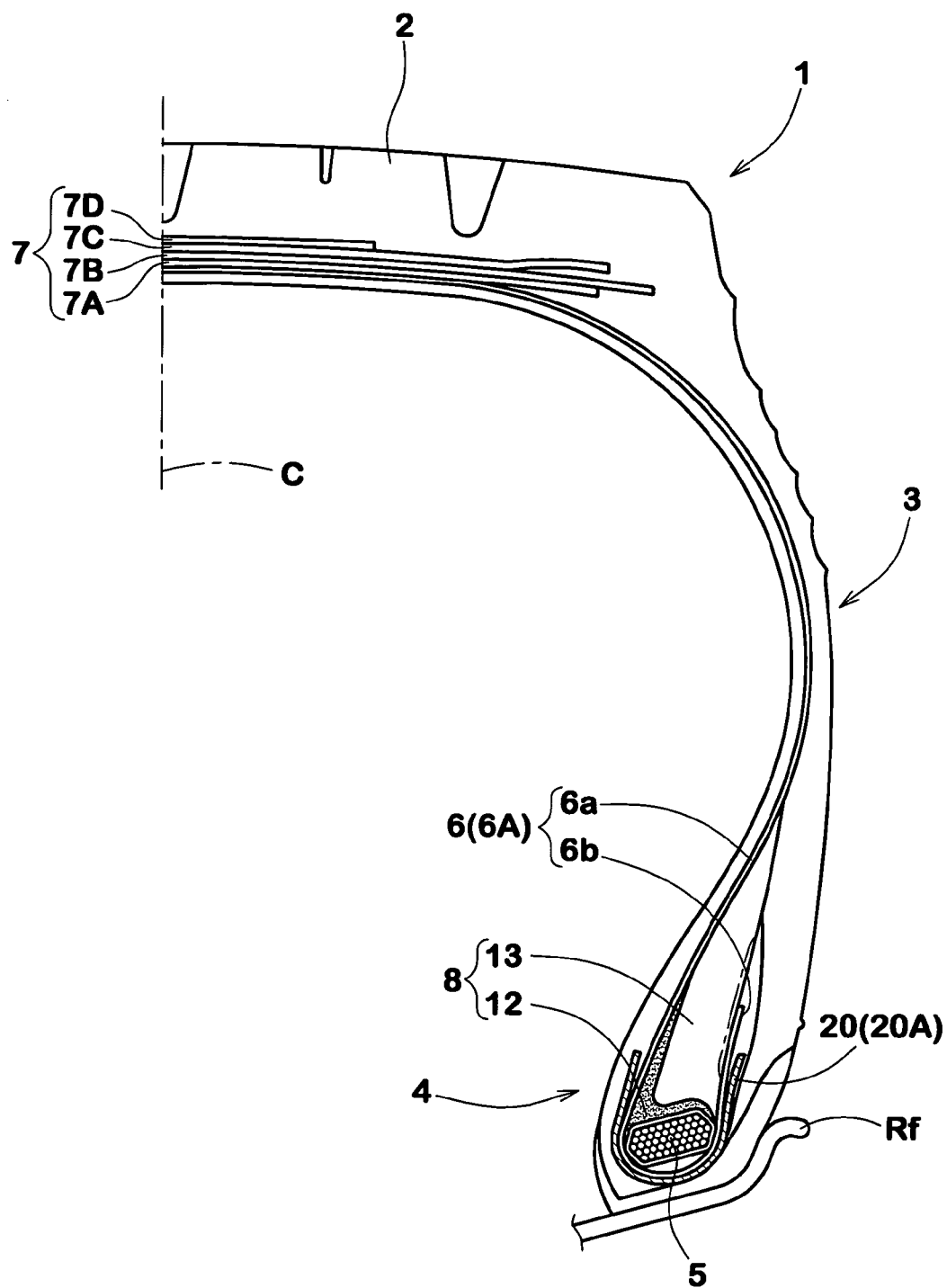
FIG. 1 is a cross sectional view of a heavy duty tire according to the present invention.

An embodiment of the present invention will now be described in detail in conjunction with the accompanying drawings.

In the drawings, a heavy duty tire 1 according to the present invention comprises: a tread portion 2; a pair of sidewall portions 3; a pair of axially spaced bead portions 4 each with a bead core 5 therein; a carcass 6 extending between the bead portions 4; and a belt 7 disposed radially outside the carcass 6 in the tread portion 2.

In this embodiment, the tire 1 is a truck/bus radial tire to be mounted on a 15-degree-tapere center-drop rim 4S having a pair of bead seats 4Sa for the bead portions 4, each seat tapered at 15 degrees toward the axial center of the wheel rim.

The belt comprises a breaker 7 and optionally a band.

The breaker 7 is composed of at least two cross plies, in this example four plies 7A, 7B, 7C, and 7D: a radially innermost ply 7A made of rubberized parallel steel cords laid at an angle of from 45 to 75 degrees with respect to the tire equator C; and radially outer plies 7B, 7C, and 7D each made of rubberized parallel steel cords laid at an angle of from 10 to 35 degrees with respect to the tire equator C.

The bead core 5 is formed by orderly winding at least one steel wire 5s into a predetermined cross sectional shape, whereby the bead core 5 has the multi layered windings of the steel wire(s) 5s. The bead core 5 in this example further includes a warping layer 11 wound around the windings so as to prevent loosening of the windings and thereby to keep the predetermined cross sectional shape. The warping layer 11 can be a rubber layer made of a hard rubber only, a rubber layer in which cords or wires are embedded, or a layer made of a rubberized fabric, e.g. canvas or the like.

The cross sectional shape of the bead core 5 has a radially inner side SL which is relatively long and substantially parallel with the bottom surface of the bead portion 4 so as to become substantially parallel with the bead seat 4Sa of the rim 4S when the tire is mounted on the rim 4S. In this example, the cross sectional shape is a hexagonal shape which is generally long in the tire axial direction. The expression "substantially parallel" means that the inclination angle may include a variation within +/−2 degrees, and also a small difference may be provided between the taper angle of the bead seat and that of the bead bottom. The radially inner side SL and a radially outer side SU are parallel with each other and are inclined at substantially 15 degrees with respect to the tire axial direction, because the bead seat 4Sa is tapered at about 15 degrees toward the axially inside. The axially inner two sides are in a V-formation, defining an axially inner face SI of the bead core. The axially outer two sides are also in a V-formation, defining an axially outer face SO of the bead core.

The carcass 6 is composed of at least one ply 6A of cords arranged radially at an angle in a range of from 70 to 90 degrees with respect to the tire equator C, extending between the bead portions 4 through the tread portion 2 and sidewall portions 3, and secured to the bead cores 5 in the bead portions.

Figure 2:
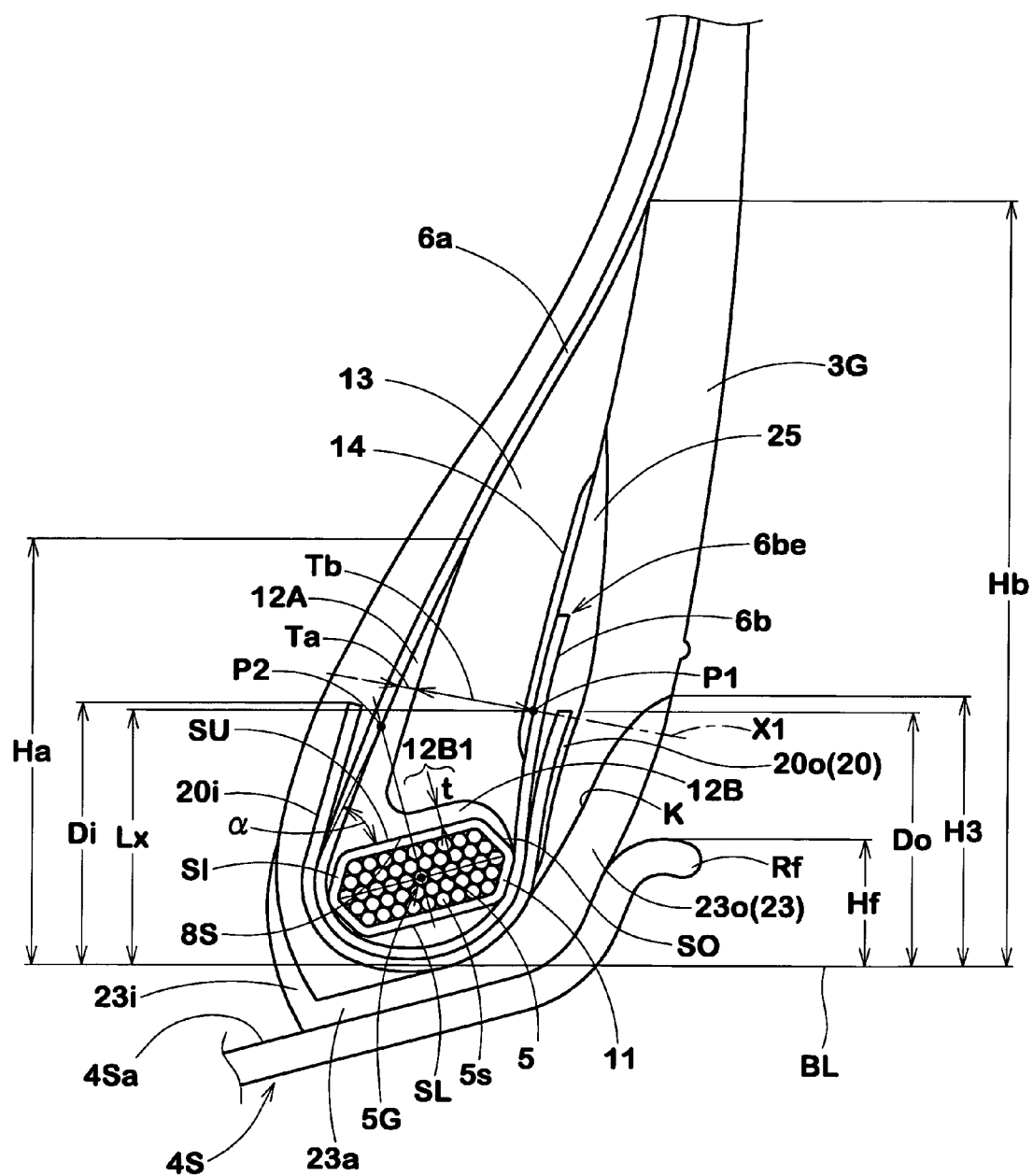
FIG. 2 is an enlarged cross sectional view of the bead portion thereof.

FIG. 2 shows an example of the carcass structure. In this example, the carcass 6 is composed of a single ply 6A of steel cords arranged radially at an angle of substantially 90 degrees with respect to the tire equator C. To be secured to the bead cores 5, the carcass ply 6A is turned up around the bead core 5 in each of the bead portions 4 from the axially inside to the axially outside of the tire, forming a pair of turned up portions 6b and a main portion 6a therebetween.

In order to reduce the amount of deformation of the bead portion (especially the movement towards the axially outside) occurring when heavily loaded and thereby to improve the bead durability, the inclination angle alpha of the carcass ply main portion 6a at a specific position P2 is set in a range of not less than 35 degrees, preferably not less than 40 degrees, but not more than 60 degrees, preferably not more than 55 degrees. The position P2 is the intersecting point of the carcass ply main portion 6a with a straight line drawn perpendicularly to the radially outer side SU of the bead core 5 (or the bottom surface of the bead portion) passing through the centroid 5G of the cross sectional shape of the bead core 5. The angle alpha is that of the tangent T to the axially outer surface of the carcass main portion 6a at the point P2. If the angle alpha is more than 60 degrees, the deformation increases and the sharing stress between the carcass and the adjacent rubber also increases; therefore, it is difficult to improve the bead durability. If the angle alpha is less than 35 degrees, it becomes difficult to provide a necessary lateral stiffness for the tire, and the steering stability is deteriorated.

Figure 3:
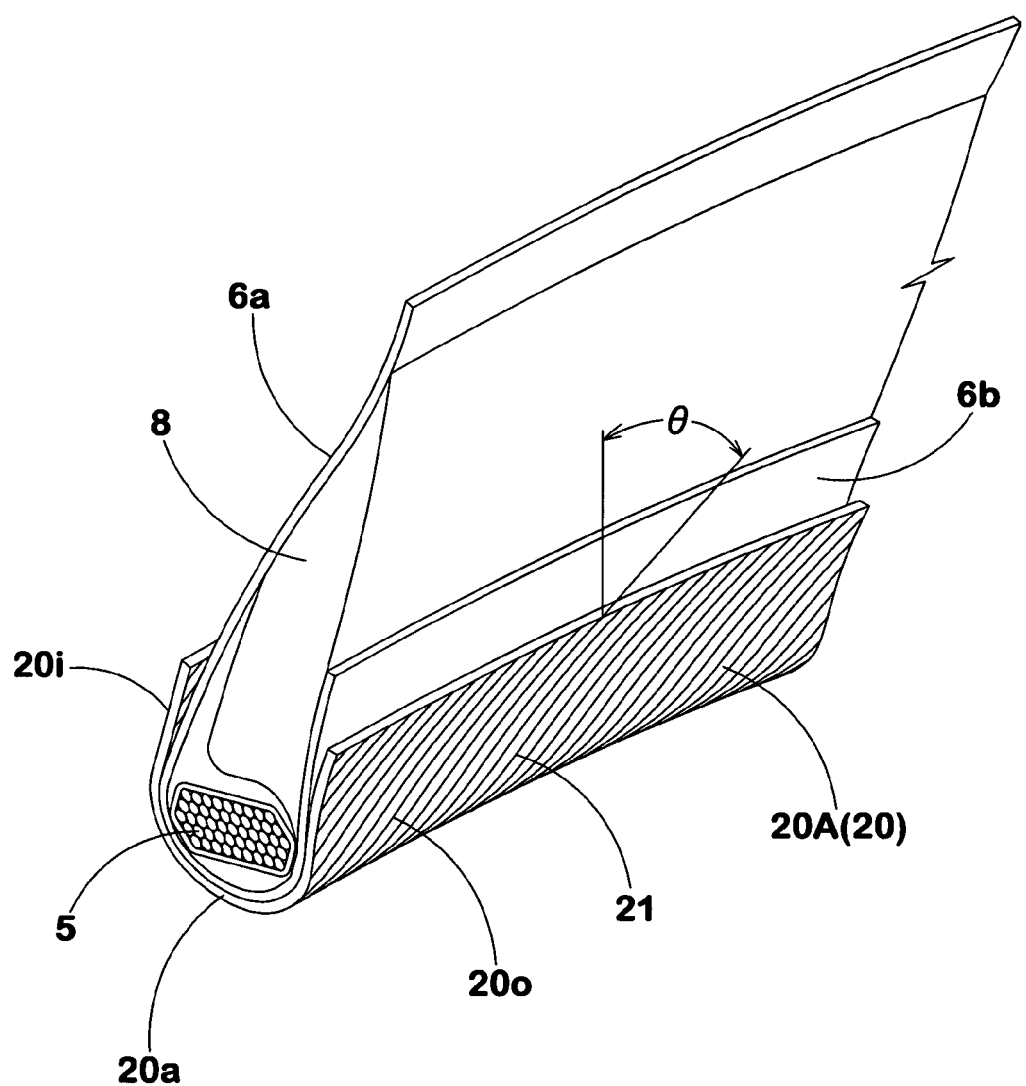
FIG. 3 is a schematic perspective view of the bead-reinforcing layer showing the steel cord arrangement.

The bead portion 4 is provided with a bead-reinforcing layer 20 to increase the bead rigidity and thereby the bead durability. The bead-reinforcing layer 20 is a rubberized parallel steel cords 21 arranged at an angle theta with respect to the tire radial direction as shown in FIG. 3. The bead-reinforcing layer 20 is made up of a base part 20a beneath the bead core 5, a radially outwardly extending axially inner part 20i, and a radially outwardly extending axially outer part 20i so as to have a U-shaped cross sectional shape.

The axially inner part 20i extends along the axially inner surface of the carcass main portion 6a.

The axially outer part 20o extends along the axially outer surface of the carcass ply turned up portion 6b.

The radial height Di of the axially inner part 20i, and the radial height Do of the axially outer part 20o are set in a range of from 150 to 300% of the height Hf of the rim flange Rf, each from the bead base line BL. If less than 150%, the reinforcing layer 20 can not exhibit its reinforcing effect. If more than 300%, damage becomes liable to occur starting from the outer ends of the inner part 20i and outer part 20o.

Further, the bead portions 4 are each provided with a bead filler 8 disposed on the radially outside SU of the bead core 5 and between the turned up portion 6b and the main portion 6a of the carcass. As shown in FIG. 2, the bead filler 8 has a radially-elongated generally triangular cross sectional shape having a bottom 8S, an axially outer side and an axially inner side.

The bead filler 8 comprises a main filler 13 made of a low modulus rubber and a fastening filler 12 made of a high modulus rubber.

As shown in FIG. 2, the fastening filler 12 has a base portion 12B extending along the radially outside SU of the bead core 5, and an axially inner portion 12A extending radially outwardly from the axially inner end of the base portion 12B along the axially outer surface of the carcass main portion 6a. Thus, the cross sectional shape of the fastening filler 12 is generally a capital letter "L".

In this example, the base portion 12B further extends axially inwardly to a position near the vent point of the V-formation of the axially inner face SI of the bead core 5, and axially outwardly to a position near the vent point of the V-formation of the axially outer face so of the bead core 5. In the base portion 12B, the axially outer end part is tapered towards the axially outside, and the axially inner end part becomes thicker since the axially inner portion 12A is connected thereto. The middle part 12B1 therebetween has an almost constant thickness (t) in a range of 0.5 to 3.0 mm. The axially inner portion 12A is continuously decreased in the thickness towards the radially outer end thereof. Thus, the cross sectional shape in this example is akin to a small letter "h" rather than "L".

The main filler 13 extends radially outwardly, abutting on the axially outer surface of the axially inner portion 12A, beyond the radially outer end of the axially inner portion 12A. From the position of the radially outer end of the axially inner portion 12A, the main filler 13 abuts on the axially outer surface of the carcass main portion 6a, and extends up to a radial height Hb. The height Hb is set in a range of from 40 to 100 mm from the bead base line BL.

The height Ha of the radially outer end of the axially inner portion 12A is set in a range of from 35 to 100 mm from the bead base line BL.

When measured along a straight line x1 drawn perpendicularly to the axially outer surface of the bead filler 8 from a point P1 thereon at a radial distance Lx of 25 mm radially outwards from the bead base line BL, the thickness Ta of the axially inner portion 12A is not less than 1.0 mm, preferably not less than 1.5 mm, but not more than 4.0 mm, preferably not more than 3.0 mm, and the thickness Tb from the point P1 to the axially inner portion 12A namely, the main filler 13 thickness is not less than 7.0 mm, preferably not less than 10.0 mm.

The ratio Ta/Tb is in a range of not less than 0.1, preferably not less than 0.15, but not more than 0.35, preferably not more than 0.25.

The complex elastic modulus $E^*1$ of the main filler 13 is in a range of not less than 2.0 MPa, but not more than 6.0 MPa. The complex elastic modulus $E^*2$ of the fastening filler 12 is in a range of not less than 20 MPa, preferably not less than 35 MPa, but not more than 70 MPa, preferably not more than 60 MPa.

As described above, since the fastening filler 12 has the L-shaped cross sectional shape, a radially inner and axially inner part of the main filler 13 is inserted between the axially inner portion 12A and the base portion 12B.

Therefore, when the bead portion is forced axially outwards, the above-mentioned radially inner and axially inner part of the main filler 13 is wedged between the portions 12A and 12B of the fastening filler 12, and resists against the compressive stress. As a result, the bead filler 8 as a whole can bring out a high bending rigidity against an axially outward bending force. Therefore, if the volume of the fastening filler 12 is the same as the conventional triangular stiffener, an increased bending rigidity can be obtained. If the same rigidity is sought, the volume can be decreased. If the total bead filler volume is the same, as the percentage of the main filler volume is increased, the effect to mitigate the shear stress occurring on the axially outside of the bead filler can be increased. On the other hand, as the internal energy loss of the high modulus rubber is relatively high, the reducing of the volume of such rubber facilitates a decrease in the rolling resistance of the tire.

If the complex elastic modulus $E^*2$ of the fastening filler 12 is less than 20 MPa, the lateral stiffness of the tire becomes insufficient, and it is difficult to secure the steering stability. If more than 70 MPa, the effect to mitigate the shear stress becomes insufficient, and it is difficult to improve the bead durability.

If the complex elastic modulus $E^*1$ of the main filler 13 is less than 2.0 MPa, the lateral stiffness of the tire becomes insufficient, and it is difficult to secure the steering stability. If more than 6.0 MPa, the effect to mitigate the shear stress becomes decreased, and it is difficult to improve the bead durability.

If the height Hb is less than 40 mm and/or the height Ha is less than 35 mm, then as the lateral stiffness (rigidity) of the tire is decreased, it becomes difficult to secure the steering stability. If the height Hb is more than 100 mm and/or the height Ha is more than 100 mm, then the volume of the bead filler 8 and/or the fastening filler 12 increases, defeating the original purpose.

If the thickness Ta is less than 1.0 mm and/or the ratio Ta/Tb is less than 0.1, then the lateral stiffness of the tire may be insufficient. If the thickness Ta is more than 4.0 mm and/or the ratio Ta/Tb is more than 0.35, then the effect to mitigate the shear stress becomes insufficient, and there is a possibility that the bead durability decreases.

If the thickness Tb is less than 7.0 mm, the effect to mitigate the shear stress becomes insufficient, and there is a tendency that the lateral stiffness of the tire decreases.

The bead portions 4 are each provided with a wear-resistant chafer 23. The chafer 23 comprises:

a base part 23a extending between the bead toe and bead heel, defining the bottom face (bs) of the bead portion 4;

an axially outer part 23o extending radially outwardly from the bead heel beyond the upper end of the wheel rim flange Rf, defining the axially outer surface of the bead portion; and an axially inner part 23i extending radially outwardly from the bead toe.

The axially inner part 23i has a radially outer end tapered and terminates at a radially height substantially same as that of the radially outer end of the bead core.

The axially outer part 23o has a radially outer end tapered and spliced with the radially inner end of the sidewall rubber 3G. The sidewall rubber 3G is softer than the chafer 23 and disposed on the axially outside of the carcass 6 in each of the sidewall portions 3, defining the outer surface of the tire.

On the tire outer surface, the boundary between the chafer 23 and sidewall rubber 3G lies at a height H3, which is more than the height Hf of the wheel rim flange Rf but less than the height Ha of the fastening filler 12. The interface K between the chafer 23 and sidewall rubber 3G extends from the axially outer part 20o of the bead-reinforcing layer 20 to the outer surface of the bead portion 4, while inclining radially outside towards the axially outside of the tire.

In order to prevent both of the crushing of the chafer 23 and the toe flaws during tire mounting or demounting operation, the chafer 23 is made of a relatively low modulus rubber which has a complex elastic modulus $E^*3$ of not less than 8.0 Mpa, preferably not less than 10 Mpa, but not more than 12 MPa, and a 100% modulus of not less than 4.0 MPa, but not more than 5.5 MPa.

Further, the steel cords 21 in the reinforcing layer 20 are inclined at an angle theta in the range of not less than 30 degrees, preferably not less than 40 degrees, but not more than 60 degrees, preferably not more than 55 degrees with respect to the radial direction. The diameter of the steel cords 21 is set in a range of from 0.8 to 1.2 mm, and the cord count of the steel cords 21 in the bead-reinforcing layer 20 is set to be not less than 25, but not more than 40 per 5 cm width. The cord count means a density of the steel cords 21 per 5 cm width of the reinforcing ply which is measured at a right angle with respect to the steel cords 21.

If the elastic modulus E*3 of the chafer 23 is less than 8 MPa and/or the 100% modulus is less than 4 MPa, then the elasticity of the chafer 23 becomes too low, therefore it is difficult to prevent the chafer crushing. If the elastic modulus E*3 is more than 12 MPa and/or the 100% modulus is more than 5.5 MPa, it is difficult to prevent the toe flaws during tire mounting or demounting operation.

If the angle theta is less than 30 degrees, it is difficult to prevent both of the toe flaws and chafer crushing even if the elastic modulus E*3 and the 100% modulus are within the aforementioned ranges. If the angle theta is more than the range 60 degrees, it becomes difficult to provide protective function for the bead portion, and the durability is deteriorated.

If the diameter is less than 0.8 mm and/or the cord count is less than 25 per 5 cm, the reinforcing effect is lessened, therefore, the chafer crushing is not prevented.

In this embodiment, further, as shown in FIG. 2, in order to prevent stress concentration on the cut ends of the steel cords of the carcass ply turned up portion 6b and bead-reinforcing layer 20, and thereby to prevent the resultant separation failure and the like, a cushion rubber layer 14 and cushion rubber layer 25 are disposed so as to cover the ends.

The cushion rubber layer 14 is disposed on the axially outside of the main filler 13 as a part of the bead filler 8, and made of a rubber having a complex elastic modulus E*1' in a range of from 2.0 to 6.0 MPa and lower than that of the main filler 13. The thickness of the cushion rubber layer 14 is at least 0.5 mm but at most 2.0 mm, excepting its radially inner and outer end portions tapered. The cushion rubber layer 14 extends radially outwardly along the axially inner surface of the turned up portion 6b beyond the outer end 6be thereof and prevents the end 6be from directly contacting with the main filler 13.

The cushion rubber layer 25 is made of a rubber having a complex elastic modulus in a range of 2.0 to 6.0 MPa and lower than that of the chafer 23 and also lower than that of the main filler 13. The cushion rubber layer 25 is disposed on the axially outside the axially outer part 20o of the bead-reinforcing layer 20, and extends radially outwardly along the axially outside of the carcass turned up portion 6b beyond both of the radially outer edges of the axially outer part 20o and turned up portion 6b.

Comparison Tests

Heavy duty radial tires of 245/70R19.5 (rim size 6.75×19.5) were made based on the specifications shown in Table 1 and tested for the resistance to toe flaws, resistance to chafer crushing, and bead durability.

Resistance to Toe Flaw:

Using a tire changer, the test tire was mounted on the rim without using detergent, and demounted. Then, the bead toe was visually inspected. The results are shown in Table 1.

Figure 4:
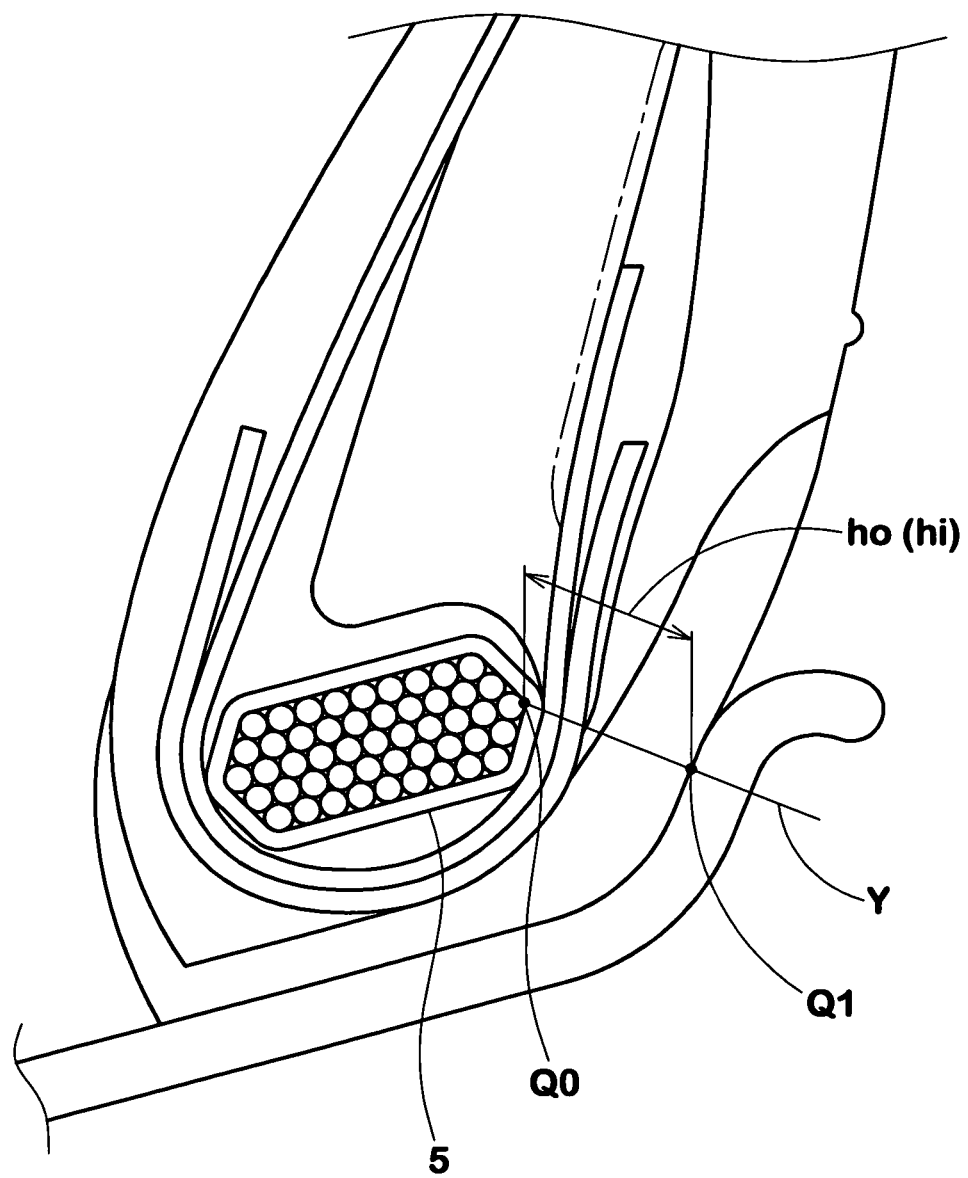
FIG. 4 is an enlarged cross sectional view for explaining the definition for the undermentioned bead heel thickness.
Figure 5:
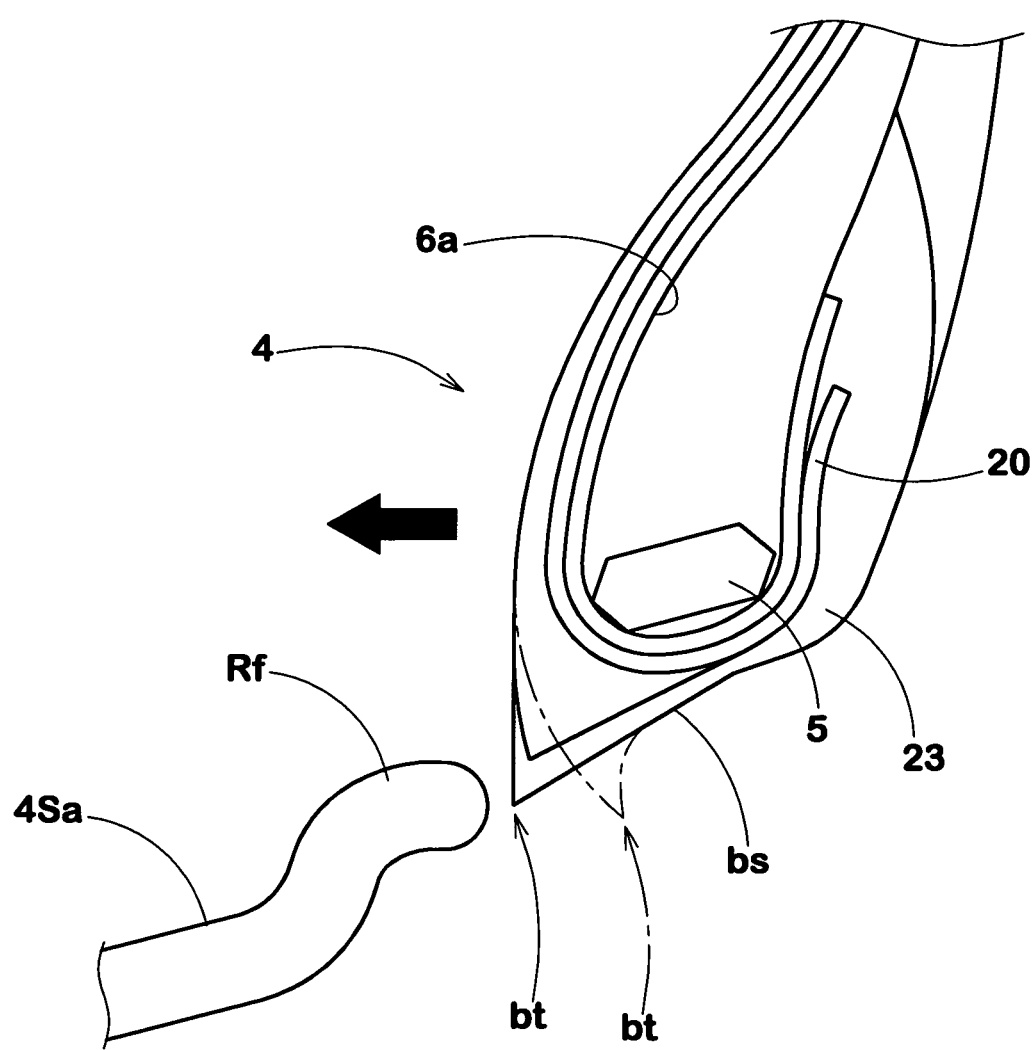
FIG. 5 is an enlarged cross sectional view for explaining the deformation of the bead toe during the tire mounting or demounting operation.

Resistance to Bead Rubber Crushing:

Defining the bead heel thickness as a distance measured from the axially outmost point Q0 of the coil of the steel wire of the bead core 5 to the outer surface of the bead portion along a straight line Y drawn from the point Q0 perpendicularly to above-mentioned outer surface as shown in FIG. 4, the bead heel thickness (ho) in a zero pressure state, and the bead heel thickness (h1) in a loaded state were measured to obtain the variation (ho−h1).

Here, the zero pressure state is such that the tire is mounted on the wheel rim but not inflated and not loaded.

The loaded state is such that the tire is mounted on the wheel rim, inflated to 850 kPa, and loaded with the maximum load of 26.72 kN.

The variation (ho−h1) is shown in Table 1 by an index based on Ref. 1 being 100, wherein the smaller the value, the better the resistance.

Bead Durability of New Tire:

Using a tire test drum, the test tire was run under the following accelerated condition until any failure was observed in the bead portions, and the elapsed time was measured.

Tire load: 300% of Maximum load (=26.72 kN×3)
Running speed: 20 km/h

The results are shown in Table 1 by an index based on Ref. 1 being 100, wherein the larger the value, the better the durability.

Bead Durability of Degraded Tire:

Firstly, the test tire was heated at 80 degrees C. for seven days to cause it to deteriorate quickly. Then, using the tire test drum, the tire was run under the following accelerated condition until any failure was observed in the bead portions, and the elapsed time was measured.

Tire load: 150% of Maximum load (=26.72 kN×1.5)
Running speed: 20 km/h

The results are shown in Table 1 by an index based on Ref. 1 being 90, wherein the larger the value, the better the durability.

TABLE 1

| Tire | Ex. 1 | Ref. 3 | Ref. 1 | Ref. 4 | Ref. 2 | Ref. 5 | Ex. 2 | Ex. 3 | Ex. 4 | Ex. 5 | Ref. 6 | Ex. 6 |
|---|---|---|---|---|---|---|---|---|---|---|---|---|
| Chafer | | | | | | | | | | | | |
| Complex modulus (Mpa) | 11 | 16 | 16 | 7 | 11 | 13 | 8 | 12 | 11 | 11 | 11 | 11 |
| 100% modulus (Mpa) | 5 | 7 | 7 | 3.5 | 5 | 6 | 4 | 5.5 | 5 | 5 | 5 | 5 |
| Bead-reinforcing layer | | | | | | | | | | | | |
| Cord angle theta (deg.) | 45 | 45 | 25 | 45 | 25 | 45 | 45 | 45 | 30 | 60 | 90 | 45 |
| Cord diameter (mm) | 1.0 | 1.0 | 1.0 | 1.0 | 1.0 | 1.0 | 1.0 | 1.0 | 1.0 | 1.0 | 1.0 | 0.8 |
| Cord count (/5 cm) | 30 | 30 | 30 | 30 | 30 | 30 | 30 | 30 | 30 | 30 | 30 | 30 |
| Height Do (mm) | 30 | 30 | 30 | 30 | 30 | 30 | 30 | 30 | 30 | 30 | 30 | 30 |
| Height Di (mm) | 30 | 30 | 30 | 30 | 30 | 30 | 30 | 30 | 30 | 30 | 30 | 30 |
| Bead filler | | | | | | | | | | | | |
| Main filler complex modulus (Mpa) | 4 | 4 | 4 | 4 | 4 | 4 | 4 | 4 | 4 | 4 | 4 | 4 |
| Fastening filler complex modulus (Mpa) | 50 | 50 | 50 | 50 | 50 | 50 | 50 | 50 | 50 | 50 | 50 | 50 |
| Thickness Ta (mm) | 1.0 | 1.0 | 1.0 | 1.0 | 1.0 | 1.0 | 1.0 | 1.0 | 1.0 | 1.0 | 1.0 | 1.0 |
| Thickness Tb (mm) | 10.0 | 10.0 | 10.0 | 10.0 | 10.0 | 10.0 | 10.0 | 10.0 | 10.0 | 10.0 | 10.0 | 10.0 |

TABLE 1-continued

| | | | | | | | | | | | | |
|---|---|---|---|---|---|---|---|---|---|---|---|---|
| Ta/Tb | 0.10 | 0.10 | 0.10 | 0.10 | 0.10 | 0.10 | 0.10 | 0.10 | 0.10 | 0.10 | 0.10 | 0.10 |
| Height Ha (mm) | 45 | 45 | 45 | 45 | 45 | 45 | 45 | 45 | 45 | 45 | 45 | 45 |
| Height Hb (mm) | 80 | 80 | 80 | 80 | 80 | 80 | 80 | 80 | 80 | 80 | 80 | 80 |
| Test results | | | | | | | | | | | | |
| Toe flaw | non | Occurred | Occurred | non | non | Occurred | non | non | non | non | non | non |
| Crush | 90 | 90 | 100 | 100 | 115 | 90 | 95 | 90 | 90 | 90 | 85 | 95 |
| Durability of new tire | 100 | 100 | 100 | 90 | 95 | 95 | 95 | 95 | 95 | 95 | 90 | 100 |
| Durability of degraded tire | 100 | 100 | 90 | 90 | 85 | 95 | 95 | 95 | 95 | 95 | 80 | 100 |

| Tire | Ex. 7 | Ref. 7 | Ex. 8 | Ex. 9 | Ref. 8 | Ref. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|
| Chafer | | | | | | | | | | | | | |
| Complex modulus (Mpa) | 11 | 11 | 11 | 11 | 11 | 11 | 11 | 11 | 11 | 11 | 11 | 11 | 11 |
| 100% modulus (Mpa) | 5 | 5 | 5 | 5 | 5 | 5 | 5 | 5 | 5 | 5 | 5 | 5 | 5 |
| Bead-reinforcing layer | | | | | | | | | | | | | |
| Cord angle theta (deg.) | 45 | 45 | 45 | 45 | 45 | 45 | 45 | 45 | 45 | 45 | 45 | 45 | 45 |
| Cord diameter (mm) | 1.2 | 0.7 | 1.0 | 1.0 | 1.0 | 1.0 | 1.0 | 1.0 | 1.0 | 1.0 | 1.0 | 1.0 | 1.0 |
| Cord count (/5 cm) | 30 | 30 | 25 | 40 | 20 | 30 | 30 | 30 | 30 | 30 | 30 | 30 | 30 |
| Height Do (mm) | 30 | 30 | 30 | 30 | 30 | 30 | 30 | 30 | 30 | 30 | 30 | 30 | 30 |
| Height Di (mm) | 30 | 30 | 30 | 30 | 30 | 30 | 30 | 30 | 30 | 30 | 30 | 30 | 30 |
| Bead filler | | | | | | | | | | | | | |
| Main filler complex modulus (Mpa) | 4 | 4 | 4 | 4 | 4 | 4 | 4 | 4 | 4 | 4 | 4 | 4 | 4 |
| Fastening filler complex modulus (Mpa) | 50 | 50 | 50 | 50 | 50 | 50 | 50 | 50 | 50 | 50 | 50 | 50 | 50 |
| Thickness Ta (mm) | 1.0 | 1.0 | 1.0 | 1.0 | 1.0 | 0.0 | 3.5 | 2.0 | 2.0 | 5.0 | 2.0 | 0.5 | 2.0 |
| Thickness Tb (mm) | 10.0 | 10.0 | 10.0 | 10.0 | 10.0 | 11.0 | 10.0 | 8.0 | 7.0 | 10.0 | 11.0 | 10.0 | 6.0 |
| Ta/Tb | 0.10 | 0.10 | 0.10 | 0.10 | 0.10 | 0 | 0.35 | 0.25 | 0.28 | 0.50 | 0.18 | 0.05 | 0.33 |
| Height Ha (mm) | 45 | 45 | 45 | 45 | 45 | 45 | 45 | 45 | 45 | 45 | 45 | 45 | 45 |
| Height Hb (mm) | 80 | 80 | 80 | 80 | 80 | 80 | 80 | 80 | 80 | 80 | 80 | 80 | 80 |
| Test results | | | | | | | | | | | | | |
| Toe flaw | non | non | non | non | non | non | non | non | non | non | non | non | non |
| Crush | 90 | 100 | 95 | 90 | 100 | 90 | 90 | 90 | 90 | 90 | 90 | 90 | 90 |
| Durability of new tire | 100 | 95 | 100 | 100 | 95 | 90 | 108 | 107 | 106 | 103 | 110 | 100 | 100 |
| Durability of degraded tire | 100 | 95 | 100 | 100 | 90 | 85 | 105 | 105 | 105 | 103 | 108 | 100 | 100 |

The invention claimed is:

1. A pneumatic tire comprising:
a pair of bead portions each with a bead core therein;
a carcass ply extending between the bead portions and turned up around the bead core in each of the bead portions from the inside to the outside of the tire to form a pair of turned up portions and a main portion therebetween;
a bead-reinforcing cord layer disposed in each of the bead portions and composed of a ply of steel cords, which ply comprises a base part beneath the bead core, an axially inner part extending radially outwardly along the carcass ply main portion, and an axially outer part extending radially outwardly along the carcass ply turned up portion, wherein the ply has a steel cord count in a range of from 25 to 40/5 cm, the steel cords have a diameter in a range of from 0.8 to 1.2 mm, and the steel cords arranged at an angle in a range of from 30 to 60 degrees with respect to the tire radial direction;
a bead filler, disposed axially outside the carcass ply main portion and radially outside the bead core in each of the bead portions, and composed of a main filler made of a low modulus rubber and a fastening filler made of a high modulus rubber, wherein the fastening filler consists of a base portion extending along the radially inner surface of the bead filler, and an axially inner portion extending radially outwardly from the base portion along the axially inner surface of the bead filler,
the base portion comprises an axially outer end part tapered towards the axially outside, an axially inner end part becoming thicker to be connected to the axially inner portion, and a middle part therebetween having an almost constant thickness in a range of 0.5 to 3.0 mm, the axially inner portion is continuously decreased in the thickness towards the radially outer end thereof, and the main filler has a part wedged between the base portion and axially inner portion of the fastening filler; and
a chafer disposed in each of the bead portions, and comprising a base part extending between the bead toe and bead heel to define the bottom surface of the bead portion, an axially outer part extending radially outwardly from the bead heel, and an axially inner part extending radially outwardly from the bead toe, wherein the chafer has a complex elastic modulus in a range of 8 to 12 MPa and a 100% modulus in a range of 4.0 to 5.5 MPa.

2. The tire according to claim 1, wherein
the height (Hb) of the radially outer end of the main filler from the bead base line is in a range of from 40 to 100 mm, and
the height (Ha) of the radially outer end of the axially inner portion of the fastening filler from the bead base line is in a range of from 35 to 100 mm, and less than the height (Hb).

3. The tire according to claim 1, wherein
in a cross section of the tire including the rotational axis of the tire, when measured along a straight line (X1) which is drawn perpendicularly to the axially outer surface of the bead filler from a point (P1) thereon at a distance of 25 mm radially outward from the bead base line, the thickness (Tb) of the main filler is not less than 7.0 mm, the thickness (Ta) of the axially inner portion is 1.0 to 4.0 mm, and the ratio (Ta/Tb) is 0.1 to 0.35.

4. The tire according to claim 1, wherein
the carcass ply is composed of steel cords arranged radially at an angle in a range of from 70 to 90 degrees with respect to the tire equator.

5. The tire according to claim 2, wherein
in a cross section of the tire including the rotational axis of the tire, when measured along a straight line (X1) which is drawn perpendicularly to the axially outer surface of the bead filler from a point (P1) thereon at a distance of 25 mm radially outward from the bead base line,
the thickness (Tb) of the main filler is not less than 7.0 mm,
the thickness (Ta) of the axially inner portion is 1.0 to 4.0 mm, and the ratio (Ta/Tb) is 0.1 to 0.35.

6. The tire according to claim 1, wherein
the base portion of the fastening filler further extends axially inwardly to a position near a bent point of a V-formation of the axially inner face of the bead core, and axially outwardly to a position near a bent point of a V-formation of the axially outer face of the bead core.

7. The tire according to claim 1, wherein
said part of the main filler wedged between the base portion and axially inner portion of the fastening filler extends axially inwardly beyond a straight line drawn, passing through the centroid of the cross sectional shape of the bead core, perpendicularly to the bottom surface of the bead portion.

\* \* \* \* \*